US009680823B2

United States Patent
Kwon et al.

(10) Patent No.: US 9,680,823 B2
(45) Date of Patent: Jun. 13, 2017

(54) CONVENIENT LOGIN METHOD, APPARATUS AND SYSTEM FOR AUTOMATICALLY DETECTING AND FILLING IN LOGIN FIELD WITHIN WEB ENVIRONMENT OR APPLICATION

(71) Applicant: INFOvine Co., Ltd., Seoul (KR)

(72) Inventors: Seung-Jun Kwon, Seoul (KR); Jae-Soo Kim, Seoul (KR); Jung-Tae Kim, Gyeonggi-do (KR); Min-Ho Kim, Incheon (KR)

(73) Assignee: INFOvine Co., Ltd., Seoul (KR)

( * ) Notice: Subject to any disclaimer, the term of this patent is extended or adjusted under 35 U.S.C. 154(b) by 92 days.

(21) Appl. No.: 14/729,742

(22) Filed: Jun. 3, 2015

(65) Prior Publication Data

US 2016/0173481 A1    Jun. 16, 2016

(30) Foreign Application Priority Data

Dec. 10, 2014  (KR) .......................... 10-2014-0177691

(51) Int. Cl.
*H04L 29/06*   (2006.01)
*H04L 29/08*   (2006.01)

(52) U.S. Cl.
CPC .......... *H04L 63/083* (2013.01); *H04L 63/102* (2013.01); *H04L 63/12* (2013.01); *H04L 67/306* (2013.01)

(58) Field of Classification Search
CPC ..... H04L 63/102; H04L 63/083; H04L 63/12; H04L 67/306; H04L 67/1002
See application file for complete search history.

(56) References Cited

U.S. PATENT DOCUMENTS

| 2004/0158746 A1* | 8/2004 | Hu .......................... G06F 21/41 726/8 |
| 2013/0023241 A1* | 1/2013 | Lim ....................... H04W 12/06 455/411 |
| 2015/0271177 A1* | 9/2015 | Mun .................... H04L 63/0853 726/7 |

FOREIGN PATENT DOCUMENTS

| JP | 2010-238202 A | 10/2010 |
| KR | 102009070768 A | 7/2009 |
| KR | 1020090128364 A | 12/2009 |
| KR | 1020130077682 A | 7/2013 |
| KR | 101468977 B1 | 12/2014 |

* cited by examiner

*Primary Examiner* — Oleg Korsak
(74) *Attorney, Agent, or Firm* — Baker Hostetler LLP

(57) ABSTRACT

A convenient login method, apparatus and system for automatically detecting and filling in a login field within a web environment or an application are disclosed herein. The convenient login system includes a client, a server, and a terminal. The client detects an ID/PW input field within a login page when a user accesses the login page, outputs a convenient login button, outputs an input box when the user clicks on the convenient login button, and automatically enters an ID/PW in the ID/PW input field. The server receives any one of the telephone number and ID information of the terminal from the client, sends a message to the terminal, receives the ID/PW from the terminal when the mobile program is run, and sends the ID/PW to the client. The terminal runs the mobile program, recombines a segmented and stored ID/PW, and sends the recombined ID/PW to the client via the server.

20 Claims, 11 Drawing Sheets

CONVENIENT LOGIN METHOD, APPARATUS AND SYSTEM FOR AUTOMATICALLY DETECTING AND FILLING IN LOGIN FIELD WITHIN WEB ENVIRONMENT OR APPLICATION

CROSS-REFERENCE TO RELATED APPLICATIONS

This application claims the benefit of Korean Patent Application No. 10-2014-0177691, filed Dec. 10, 2014, which is hereby incorporated by reference herein in its entirety.

BACKGROUND

1. Technical Field

Embodiments of the present invention relate to a login method, apparatus and system and, more particularly, to technology for automatically detecting a login field within a web environment or an application and automatically filling in the login field.

2. Description of the Related Art

In general, when a user directly enters his or her login information using a client in order to log in to a web page, he or she must memorize login information for each web page to be used.

However, a problem may arise in that such login information is easily forgotten. Furthermore, although the login information of a user is stored in a client or a server in order to perform automatic login, a problem arises in that the login information of the user is divulged if the client or server is subjected to hacking.

Therefore, there is a need for a new login service technology for minimizing the divulgence of login information without requiring a user to directly enter login information in a web page.

SUMMARY

At least some embodiments of the present invention are directed to the provision of a method, apparatus and system for minimizing the divulgence of login information by performing login through only the authentication of a mobile phone without requiring a user to enter an ID/password (PW) in a login page.

At least some embodiments of the present invention are directed to the provision of a method, apparatus and system for providing a more convenient login service by automatically detecting an ID/PW input field in a login page and automatically filling an ID/PW in the detected input field.

At least some embodiments of the present invention are directed to the provision of a method, apparatus, and system for segmenting and storing the ID/PW of a user in two or more isolated repositories, recombining the segmented and stored ID/PW of the user after a user authentication has been successful, and using the recombined ID/PW of the user, thereby providing a login service having further enhanced security.

In accordance with an aspect of the present invention, there is provided a convenient login service provision method for automatically detecting and filling in a login field within a web environment or an application, including: analyzing, by a client, the HTML sentence structure of a login page by executing the script of a client program, different from a web browser, when a user accesses the login page via the web browser; detecting, by the client, an identification/password (ID/PW) input field within the login page as a result of the analysis of the HTML sentence structure; outputting, by the client, a convenient login button to one side of the ID/PW input field by executing the script; outputting, by the client, an input box for obtaining any one of the telephone number and ID information of a terminal when the user clicks on the convenient login button; sending, by a server, a message for the running of a mobile program to the terminal when the user enters any one of the telephone number and ID information of the terminal in the input box; displaying, by the terminal, a personal ID number input box by executing the script of the mobile program; verifying, by the server, a personal ID number when the user enters the personal ID number in the personal ID number input box; recombining, by the terminal, a segmented and stored ID/PW if the verification of the personal ID number is successful, and sending the recombined ID/PW to the client via the server; and receiving, by the client, the recombined ID/PW and automatically entering by the client, the recombined ID/PW in the ID/PW input field.

In accordance with another aspect of the present invention, there is provided a convenient login service provision method of automatically detecting and filling in a login field within a web environment or an application, including: activating, by a client, the accessibility function of the client by executing the script of a mobile program, different from a mobile web browser, and a mobile application when a user accesses a login page using any one of the mobile web browser and the mobile application; determining, by the client, whether an access program for the login page is the mobile web browser or the mobile application using the accessibility function, and detecting, by the client, an ID/PW input field within the login page based on the result of the determination; outputting, by the client, a convenient login button to one side of the ID/PW input field by executing the script; displaying, by the client, a personal ID number input box for authenticating the user when the user clicks on the convenient login button; verifying, by a server, the personal ID number when the user enters a personal ID number in the personal ID number input box; recombining, by a terminal, a segmented and stored ID/PW if the verification of the personal ID number is successful; and automatically entering, by the client, the recombined ID/PW in the ID/PW input field.

In accordance with still another aspect of the present invention, there is provided a client, including: an ID/PW field detection unit configured to detect an ID/PW input field within a login page when a user accesses the login page via a web browser; an ID/PW field filling-in unit configured to output a convenient login button to one side of the ID/PW input field, output an input box for obtaining any one of a telephone number and ID information of a terminal when the user clicks on the convenient login button, and automatically entering an ID/PW received from the terminal in the ID/PW input field via a server when the user enters any one of the telephone number and ID information of the terminal in the input box; and a communication unit configured to encrypt any one of the telephone number and ID information of the terminal entered in the input box by the user, and send any one of the encrypted telephone number and the encrypted ID information to the terminal via the server.

The ID/PW field detection unit may detect the ID/PW input field within the login page by executing the script of a client program that is different from the web browser.

The ID/PW field filling-in unit may output the convenient login button and the input box to the login page, and may also automatically enter the ID/PW in the ID/PW input field by executing the script.

The ID/PW segments of the ID/PW may be stored at two or more storage locations.

The ID/PW may be segmented into the ID/PW segments and stored in the terminal and the server; and the ID/PW field filling-in unit may receive the ID/PW generated by the terminal through the recombination of the ID/PW segments.

The ID/PW field detection unit may determine an input field, whose input tag is a password type, to be a password input field by analyzing the HTML sentence structure of the login page, and may determine an input field immediately before the password input field to be an ID input field.

The user may enter any one of the telephone number and ID information of the terminal in the input box, and the communication unit may deliver any one of the telephone number and ID information of the terminal to the server so that the server sends a message for the running of a mobile program to the terminal.

The ID/PW field detection unit may receive the ID/PW if the verification of a personal ID number performed by the terminal and the server is successful.

In accordance with still another aspect of the present invention, there is provided a terminal, including: an ID/PW field detection unit configured to detect an ID/PW input field within a login page when a user accesses the login page using any one of a mobile web browser and a mobile application; an ID/PW field filling-in unit configured to output a convenient login button to one side of the ID/PW input field, output a personal ID number input box for authenticating the user when the user clicks on the convenient login button, and automatically enter an ID/PW in the ID/PW input field if the authentication is successful; a user authentication request unit configured to send a PIN number, input to the terminal by the user, to a server in order to request the server to verify whether the user is an approved user; a communication unit configured to send the ID/PW to a client via the server when login to a web page is requested by the client; and an ID/PW recombination unit configured to segment and store the ID/PW of the user and recombine the segmented and stored ID/PW.

The ID/PW field detection unit may detect the ID/PW input field within the login page by executing the script of a mobile program, different from the mobile web browser and the mobile application.

The ID/PW field filling-in unit may output the convenient login button to the login page, and may also automatically enter the ID/PW to the ID/PW input field by executing the script.

The ID/PW recombination unit may store ID/PW segments of the ID/PW at two or more storage locations.

The ID/PW recombination unit may store the ID/PW segments of the ID/PW in the terminal and the server, and may recombine the ID/PW segments into the ID/PW.

The ID/PW field detection unit may activate the accessibility function of the terminal, may determine whether an access program for the login page is the mobile web browser or the mobile application using the accessibility function, and may detect the ID/PW input field within the login page based on the result of the determination.

The ID/PW field detection unit may obtain the name of an application package being executed on the terminal using the accessibility function, may determine the access program to be the mobile web browser if the name of the application package is identical with a name of a predetermined mobile web browser, and may determine the access program to be the mobile application if the name of the application package is not identical with the name of the predetermined mobile web browser.

The ID/PW field detection unit may detect the ID/PW input field by analyzing the HTML sentence structure of the login page if the access program is the mobile web browser, and may detect the ID/PW input field by analyzing user interface data of the login page if the access program is the mobile application.

In accordance with still another aspect of the present invention, there is provided a convenient login system for automatically detecting and filling in a login field within a web environment or an application, including: a client configured to detect an ID/PW input field within a login page when a user accesses the login page via a web browser, output a convenient login button to one side of the ID/PW input field, output an input box for obtaining any one of the telephone number and ID information of a terminal when the user clicks on the convenient login button, and automatically enter an ID/PW, received from the terminal, in the ID/PW input field via a server when the user enters any one of the telephone number and ID information of the terminal in the input box; the server configured to receive any one of the telephone number and ID information of the terminal from the client, send a message for the running of a mobile program to the terminal, receive the ID/PW from the terminal when the mobile program is run, and send the ID/PW to the client; and the terminal configured to run the mobile program, recombine a segmented and stored ID/PW, and send the recombined ID/PW to the client via the server.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
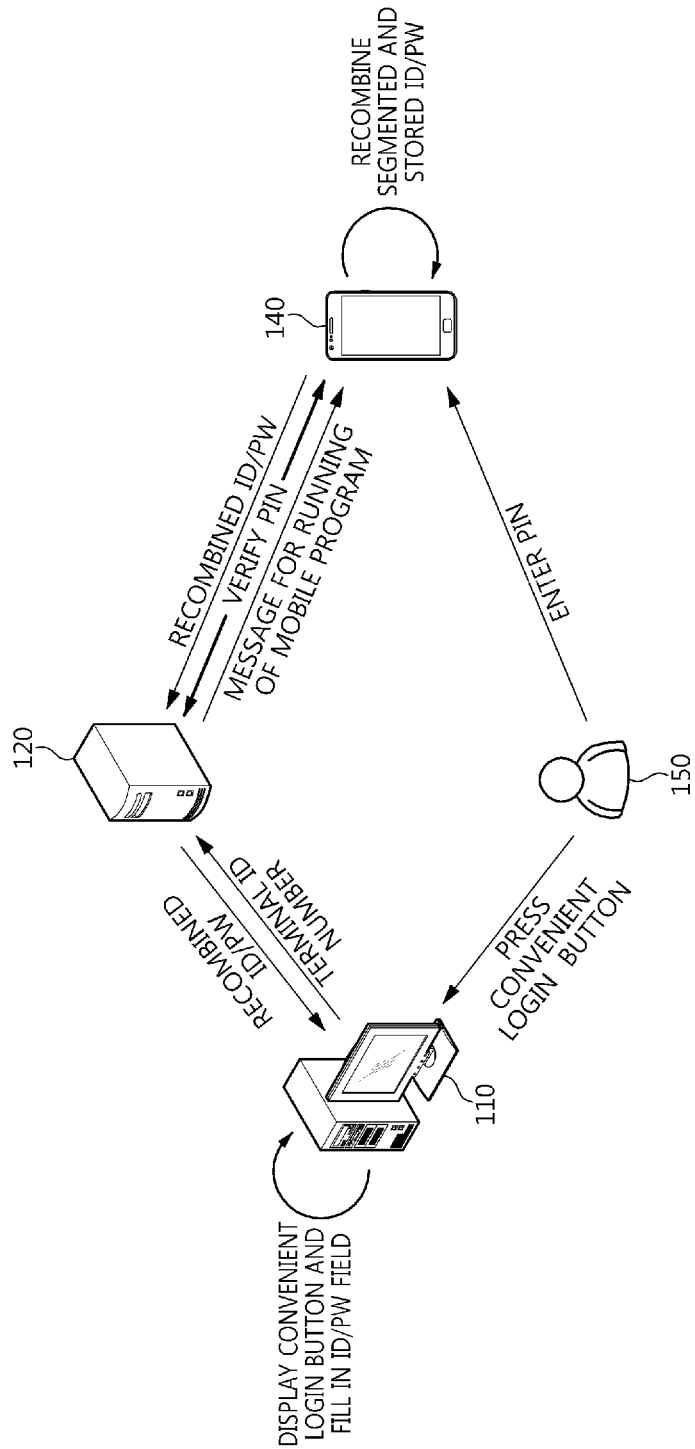
FIG. 1 illustrates a convenient login system for automatically detecting and filling in a login field within a web environment or an application according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. Embodiments of the present invention are intended to fully describe the present invention to a person having ordinary knowledge in the art to which the present invention pertains. Accordingly, the shapes, sizes, etc. of components in the drawings may be exaggerated to make the description clear.

Embodiments of the present invention are described in detail below with reference to the accompanying drawings.

FIG. 1 illustrates a convenient login system for automatically detecting and filling in a login field within a web environment or an application according to an embodiment of the present invention.

The convenient login system for automatically detecting and filling in a login field within a web environment or an application according to the present embodiment may include a client 110, a server 120, and a terminal 140.

The client 110 may display a login page to a user 150 via a web browser. In response to the input of a convenient login button from the user 150, the client 110 may invoke an application program interface by executing the script of a client program, may request and receive login information, and may perform login using the login information.

The client 110 may be a communication device, such as a personal computer (PC), a notebook computer, a mobile phone, a tablet PC, a navigation system, a smart phone, a personal digital assistant (PDA), or a digital video broadcasting (DVB) terminal.

The login page may be a web page or a web site.

The login information may not be limited to an ID/PW, but may refer to information used to log in to a web page.

The ID/PW or login information may be information input by the user 150 for the member subscription of a web page.

The script executed by the client 110 may be the script of a client program that is installed on the client separately from the web browser.

The client 110 may detect an ID/PW input field within a login page.

Furthermore, the client 110 may output the convenient login button to one side of the ID/PW input field.

When the user 150 clicks on the convenient login button, the client 110 may display an input box for receiving the ID information of the terminal 140 from the user 150 via the application program interface and receive the ID information of the terminal 140 from the user 150.

The ID information of the terminal 140 may be information capable of uniquely identifying the terminal 140, such as a mobile directory number (MDN) or a mobile identification number (MIN).

The client 110 may deliver the received ID information to the server 120. The server 120 may send a message for the running of a mobile program to the terminal 140.

The message for the running of a mobile program may be an SMS or PUSH message.

The client 110 may receive any one of an ID/PW and login information from the mobile program via the server 120, and may automatically enter any one of the ID/PW and the login information in the ID/PW input field.

The client 110 may generate a login event and automatically perform login to a web page via the login event.

The login information may be information required to perform login to a corresponding web page. For example, the login information may be the ID and password of a corresponding web page.

The login information may have been input to the mobile program by the user 150 in the form of one-time log-in information.

The login information may have been input and stored to and in the mobile program by the user 150. The login information may be stored in a USIM security token. The USIM security token may be a security token including a security module within a general-purpose universal subscriber identity module (USIM) card.

The login information may be manually stored in response to selection from the user 150. Alternatively, the login information may be automatically stored without selection from the user 150.

The login information may be stored in a cloud while operating in conjunction with the mobile program.

The login information may be segmented and stored at two or more storage locations.

The server 120 may form a security channel along with the mobile program of the terminal 140, and may receive any one of the ID/PW and the login information over the security channel.

The server 120 may directly send an SMS or PUSH message to the terminal 140 over a mobile communication network. The server 120 may send the SMS or PUSH message via a separate relay server.

The terminal 140 may run the mobile program, may recombine an ID/PW that have been segmented and stored at the two or more storage locations, and may send the recombined ID/PW to the client 110 via the server 120.

The mobile program may include a mobile USIM applet.

Figure 2:
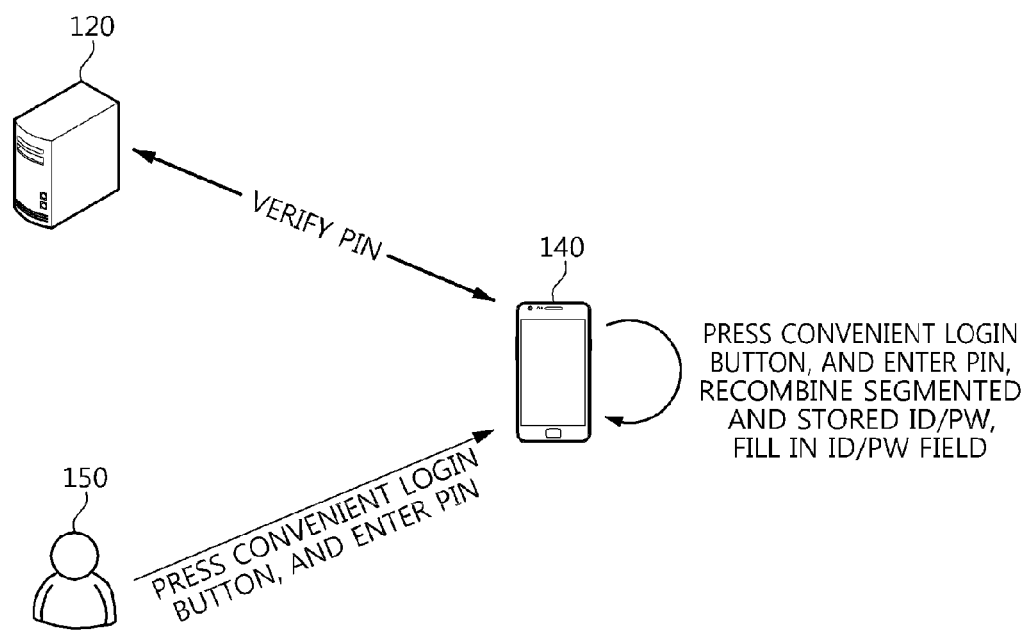
FIG. 2 illustrates a convenient login system for automatically detecting and filling in a login field within a web environment or an application according to another embodiment of the present invention.

FIG. 2 illustrates a convenient login system for automatically detecting and filling in a login field within a web environment or an application according to another embodiment of the present invention.

The convenient login system for automatically detecting and filling in a login field within a web environment or an application according to the present embodiment may include a server 120 and a terminal 140.

The terminal 140 may display a login page to a user 150 via a mobile web browser or a mobile application, and may perform login by executing the script of a mobile program in response to the input of a convenient login button from the user 150.

The terminal 140 may be a handheld communication device, such as a mobile phone, a tablet PC, a navigation system, a smart phone, or a PDA.

The script executed by the terminal 140 may be the script of the mobile program that is installed on the terminal separately from the mobile web browser or the mobile application.

The terminal 140 may detect an ID/PW input field within the login page.

Furthermore, the terminal 140 may output the convenient login button to one side of the ID/PW input field.

When the user 150 clicks on the convenient login button, the terminal 140 may automatically enter any one of an ID/PW and login information in the ID/PW input field.

The terminal 140 may generate a login event and automatically perform login to a web page via the login event.

Figure 3:
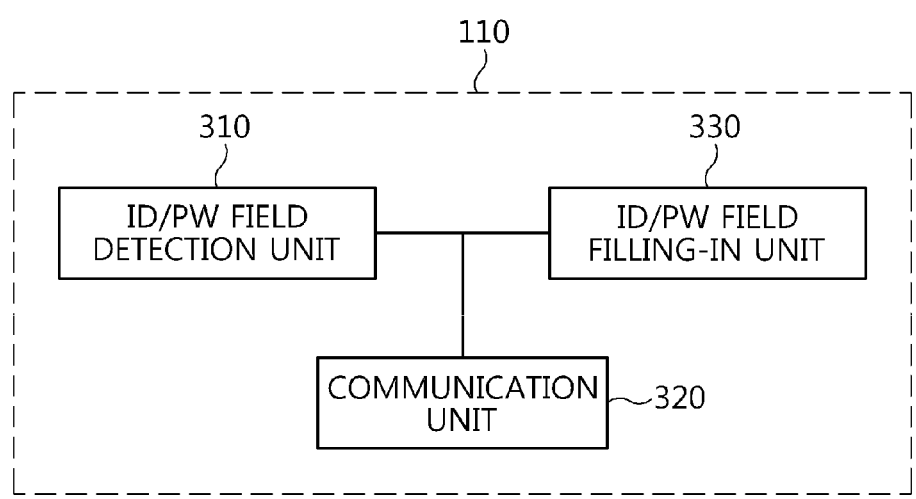
FIG. 3 is a block diagram of a client according to an embodiment of the present invention.

FIG. 3 is a block diagram of a client according to an embodiment of the present invention.

The client 110 may include an ID/PW field detection unit 310, a communication unit 320, and an ID/PW field filling-in unit 330.

When the user 150 accesses a login page via a web browser, the ID/PW field detection unit 310 may detect an ID/PW input field within the login page.

The ID/PW field detection unit 310 may detect the ID/PW input field within the login page by executing the script of a client program that is different from a web browser.

Furthermore, the ID/PW field detection unit 310 may output a convenient login button and an input box to the login page by executing the script, and may automatically enter an ID/PW in the ID/PW input field.

The ID/PW of the ID/PW may be stored at two or more storage locations. For example, the ID/PW of the ID/PW may be stored in the terminal 140 and the server 120.

Furthermore, the ID/PW field detection unit 310 may determine an input field, that is, an input field whose input tag is a password type, to be a password input field by analyzing the HTML sentence structure of the login page, and may determine an input field immediately before the password input field to be an ID input field.

Furthermore, if the verification of a personal ID number by the terminal 140 and the server 120 is successful, the ID/PW field detection unit 310 may receive the ID/PW.

The communication unit 320 may encrypt any one of the telephone number and ID information of the terminal 140 entered in the input box by the user, and may send any one of the encrypted telephone number and the encrypted ID information to the terminal 140 via the server 120.

When the user 150 enters any one of the telephone number and ID information of the terminal 140 in the input box, the communication unit 320 may deliver any one of the telephone number and ID information of the terminal 140 to the server 120 so that the server 120 sends a message for the running of a mobile program to the terminal 140.

The ID/PW field filling-in unit 330 may output a convenient login button to one side of the ID/PW input field. When the user 150 clicks on the convenient login button, the ID/PW field filling-in unit 330 may output an input box for obtaining any one of the telephone number and ID information of the terminal 140. When the user 150 enters any one of the telephone number and ID information of the terminal 140 in the input box, the ID/PW field filling-in unit 330 may automatically enter the ID/PW, received from the terminal 140, in the ID/PW input field via the server 120.

The ID/PW field filling-in unit 330 may receive an ID/PW generated by recombining the ID/PW by the terminal 140.

A method in which the ID/PW field detection unit 310 detects an ID/PW input field within a login page by executing the script of a client program and the ID/PW field filling-in unit 330 automatically enters an ID/PW in the ID/PW input field is described in detail below.

At a first step, the ID/PW field detection unit 310 may be registered as an extension program of a web browser. When the ID/PW field detection unit 310 is registered as an extension program of the web browser, the ID/PW field detection unit 310 may download a Javascript file, to be attached when a web page access event DISPID_BEFORENAVIGATE2 occurs, from the server 120. Furthermore, when an HTML download completion event DISPID_DOCUMENTCOMPLETE occurs in the web page, the ID/PW field detection unit 310 may give an instruction so that Javascript is attached. In response to the instruction, Javascript may be executed on an accessed page.

At a second step, the ID/PW field detection unit 310 may arrange all the input tags of a current page in a list form and search for "password" by checking the types of input tags. When a "password" input tag is detected, the ID/PW field detection unit 310 may detect an input tag immediately before the detected "password" input tag as "id". Through this detection, the ID/PW field detection unit 310 may detect the ID/PW input field of an attached page.

At a third step, after receiving "id" and "password", the ID/PW field detection unit 310 may arrange all the form tags of a corresponding page in a list form and detect the "id" input tag and the "password" input tag, detected at the second step, in the form tags.

At a fourth step, the ID/PW field detection unit 310 may enter the received "id" in the "idField.value" of the detected "id" input tag and enter the received "password" in the "pwdField.value" of the detected "password" input tag.

At a fifth step, the ID/PW field detection unit 310 may automatically perform login to the form detected at the third step by executing a "formTag.onsubmit( )" method or "formTag.submit( )" method.

Figure 4:
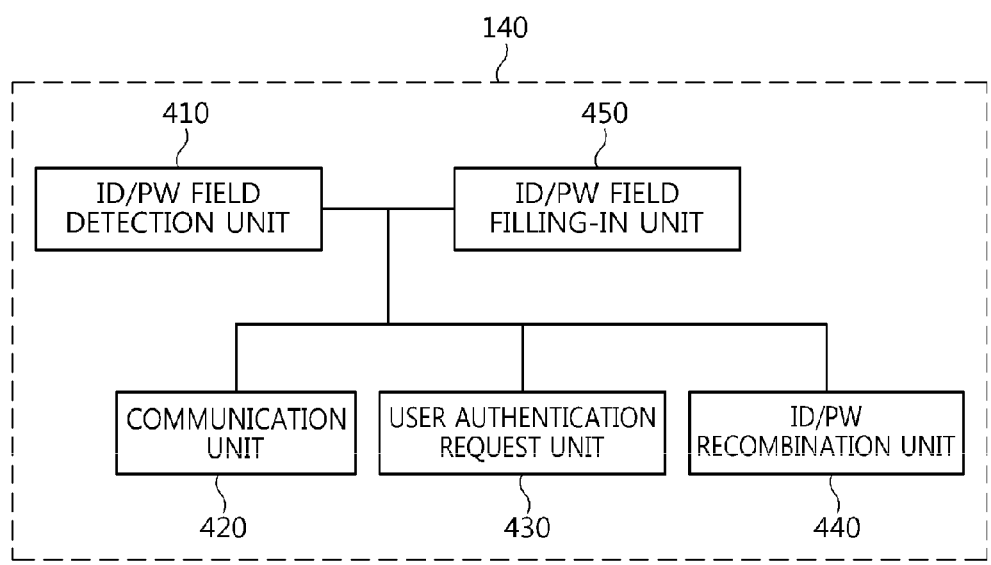
FIG. 4 is a block diagram of a terminal according to an embodiment of the present invention.

FIG. 4 is a block diagram illustrating a terminal according to an embodiment of the present invention.

The terminal 140 may include an ID/PW field detection unit 410, a communication unit 420, a user authentication request unit 430, an ID/PW recombination unit 440, and an ID/PW field filling-in unit 450.

When a user accesses a login page using any one of a mobile web browser and a mobile application, the ID/PW field detection unit 410 may detect an ID/PW input field within the login page.

The ID/PW field detection unit 410 may detect the ID/PW input field within the login page by executing the script of a mobile program that is different from the mobile web browser and the mobile application.

Furthermore, the ID/PW field detection unit 410 may activate the accessibility function of the terminal 140, and may determine whether an access program for the login page is the mobile web browser or the mobile application using a the accessibility function. The ID/PW field detection unit 410 may detect the ID/PW input field within the login page based on the result of the determination.

Furthermore, the ID/PW field detection unit 410 may obtain the name of an application package that is being executed on the terminal 140 using the accessibility function. If the name of the application package is the same as the name of a predetermined mobile web browser, the ID/PW field detection unit 410 may determine the access program to be the mobile web browser. If the name of the application package is not the same as the name of the predetermined mobile web browser, the ID/PW field detection unit 410 may determine the access program to be the mobile application.

Furthermore, if the access program is determined to be the mobile web browser, the ID/PW field detection unit 410 may detect the ID/PW input field by analyzing the HTML sentence structure of the login page. If the access program is determined to be the mobile application, the ID/PW field detection unit 410 may detect the ID/PW input field by analyzing the user interface data of the login page.

If login to a web page is requested by the client 110, the communication unit 420 may send an ID/PW to the client 110 via the server 120.

The user authentication request unit 430 may request verification regarding whether the user 150 is an approved user by sending a PIN number, input to the terminal by the user 150, to the server 120.

The ID/PW recombination unit 440 may segment and store the ID/PW of the user, and may recombine the segmented and stored ID/PW.

The ID/PW recombination unit 440 may store the ID/PW segments of the ID/PW at two or more storage locations.

For example, the ID/PW recombination unit 440 may store the ID/PW segments of the ID/PW in the terminal 140 and the server 120, and may recombine the ID/PW segments into the ID/PW.

The ID/PW field filling-in unit 450 may output a convenient login button to one side of the ID/PW input field. When the user clicks on the convenient login button, the ID/PW field filling-in unit 450 may output a personal ID number input box for the authentication of the user. If the authentication is successful, the ID/PW field filling-in unit 450 may automatically enter the ID/PW in the ID/PW input field.

The ID/PW field filling-in unit 450 may output the convenient login button to the login page by executing a script. The ID/PW field filling-in unit 450 may automatically enter the ID/PW in the ID/PW input field.

A method in which the ID/PW field detection unit 410 determines whether an access program for a login page is a mobile web browser or a mobile application using the accessibility function of the terminal 140 is described in detail below.

At a first step, the ID/PW field detection unit 410 may activate the smart login accessibility function of the terminal 140 and the keyboard of the terminal 140.

At a second step, when the accessibility function is activated and an application is executed, the ID/PW field detection unit 410 may obtain the user interface attribute of an application screen and the name of the package of the application screen.

At a third step, if the name of the package of the application screen indicates a predetermined package, the ID/PW field detection unit 410 may determine an access program for a login page to be a mobile web browser. For example, the predetermined package may be a basic Android browser, Chrome, Samsung browser, or HTC browser package.

At a fourth step, the name of the package of the application screen does not indicate a predetermined package, the ID/PW field detection unit 410 may determine the access program for the login page to be a mobile application.

A method in which the ID/PW field detection unit 410 detects an ID/PW input field within a login page by executing the script of a mobile program if an access program for a login page is a mobile web browser is described in detail below.

At a first step, the ID/PW field detection unit 410 may obtain the user interface data of a mobile web browser using an accessibility function.

At a second step, the ID/PW field detection unit 410 may obtain the text value of all the "edittext" elements included in the user interface data.

At a third step, the ID/PW field detection unit 410 may determine whether the text value is indicative of an URL.

At a fourth step, if it is determined that the text value is indicative of an URL, the ID/PW field detection unit 410 may obtain the HTML data of the URL using an HTML parser.

At a fifth step, if there is an input box having a "password" attribute in the obtained HTML data, the ID/PW field detection unit 410 may recognize a web page, indicated by the URL, as a login page.

A method in which the ID/PW field detection unit 410 detects an ID/PW input field within a login page by executing the script of a mobile program if an access program for the login page is a mobile application is described in detail below.

At a first step, the ID/PW field detection unit 410 may obtain the user interface data of the current screen of an application using an accessibility function.

At a second step, if the attribute of the edittext element of user interface data is "password=true", the ID/PW field detection unit 410 may recognize the web page of a mobile application as a login page.

Figure 5:
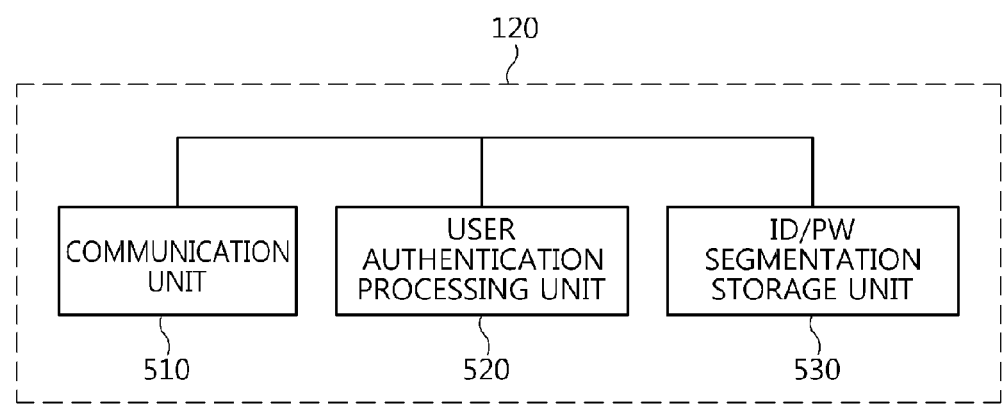
FIG. 5 is a block diagram of a server according to an embodiment of the present invention.

FIG. 5 is a block diagram illustrating a server according to an embodiment of the present invention.

The server 120 may include a communication unit 510, a user authentication processing unit 520, and an ID/PW segmentation storage unit 530.

The communication unit 510 may receive any one of the telephone number and ID information of the terminal 140 received from the client 110, and may send a mobile program running request message to the terminal 140.

Furthermore, when login to a web page is requested by the client 110, the communication unit 510 may receive an ID/PW from the terminal 140 and deliver the ID/PW to the client 110.

The user authentication processing unit 520 may determine whether the user 150 is an approved user by verifying a PIN number input to the terminal 140.

The ID/PW segmentation storage unit 530 may segment and store the ID/PW of the user 150.

Figure 6:
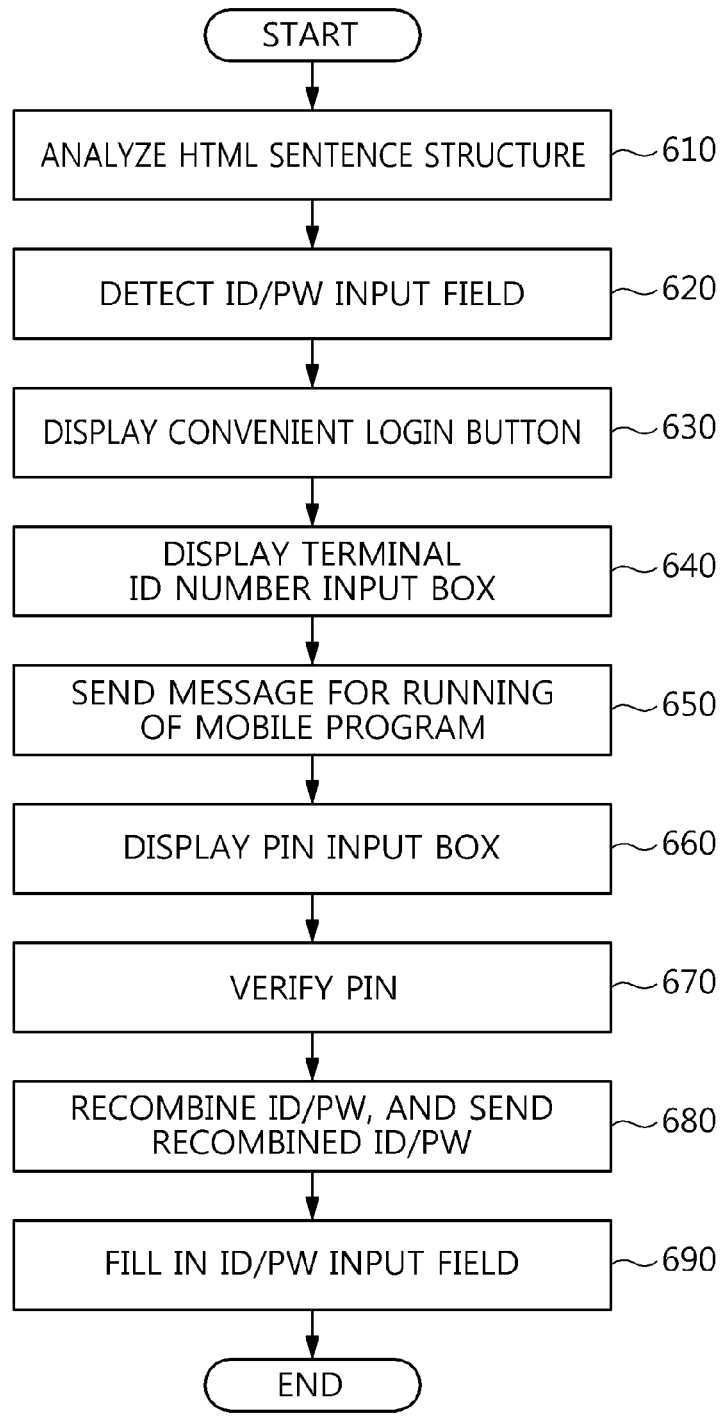
FIG. 6 is a flowchart illustrating a convenient login method of automatically detecting and filling in a login field within a web environment or an application according to an embodiment of the present invention.

FIG. 6 is a flowchart illustrating a convenient login method of automatically detecting and filling in a login field within a web environment or an application according to an embodiment of the present invention.

At step 610, in the convenient login method of automatically detecting and filling in a login field within a web environment or an application according to an embodiment of the present invention, when the user 150 accesses a login page via a web browser, the HTML sentence structure of the login page may be analyzed by executing the script of a client program that is different from the web browser.

Furthermore, at step 620, in the convenient login method of automatically detecting and filling in a login field within a web environment or an application according to an embodiment of the present invention, an ID/PW input field within the login page may be detected as a result of the analysis of the HTML sentence structure.

Furthermore, at step 630, in the convenient login method of automatically detecting and filling in a login field within a web environment or an application according to an embodiment of the present invention, a convenient login button may be output to one side of the ID/PW input field by executing the script.

Furthermore, at step 640, in the convenient login method of automatically detecting and filling in a login field within a web environment or an application according to an embodiment of the present invention, when the user 150 clicks on the convenient login button, an input box for obtaining any one of the telephone number and ID information of the terminal 140 may be output.

Furthermore, at step 650, in the convenient login method of automatically detecting and filling in a login field within a web environment or an application according to an embodiment of the present invention, when the user 150 enters any one of the telephone number and ID information of the terminal 140 in the input box, the server 120 may send a message for the running of a mobile program to the terminal 140.

Furthermore, at step 660, in the convenient login method of automatically detecting and filling in a login field within a web environment or an application according to an embodiment of the present invention, the terminal 140 may display a personal ID number input box by executing the script of the mobile program.

Furthermore, at step 670, in the convenient login method of automatically detecting and filling in a login field within a web environment or an application according to an embodiment of the present invention, when the user enters a personal ID number in the personal ID number input box, the server 120 may verify the personal ID number.

Furthermore, at step 680, in the convenient login method of automatically detecting and filling in a login field within a web environment or an application according to an embodiment of the present invention, when the verification of the personal ID number is successful, the terminal 140 may recombine stored ID/PW segments and send the recombined ID/PW to the client 110 via the server 120.

Furthermore, at step 690, in the convenient login method of automatically detecting and filling in a login field within a web environment or an application according to an embodiment of the present invention, the client 110 may receive the recombined ID/PW and automatically enter the recombined ID/PW in the ID/PW input field.

Figure 7:
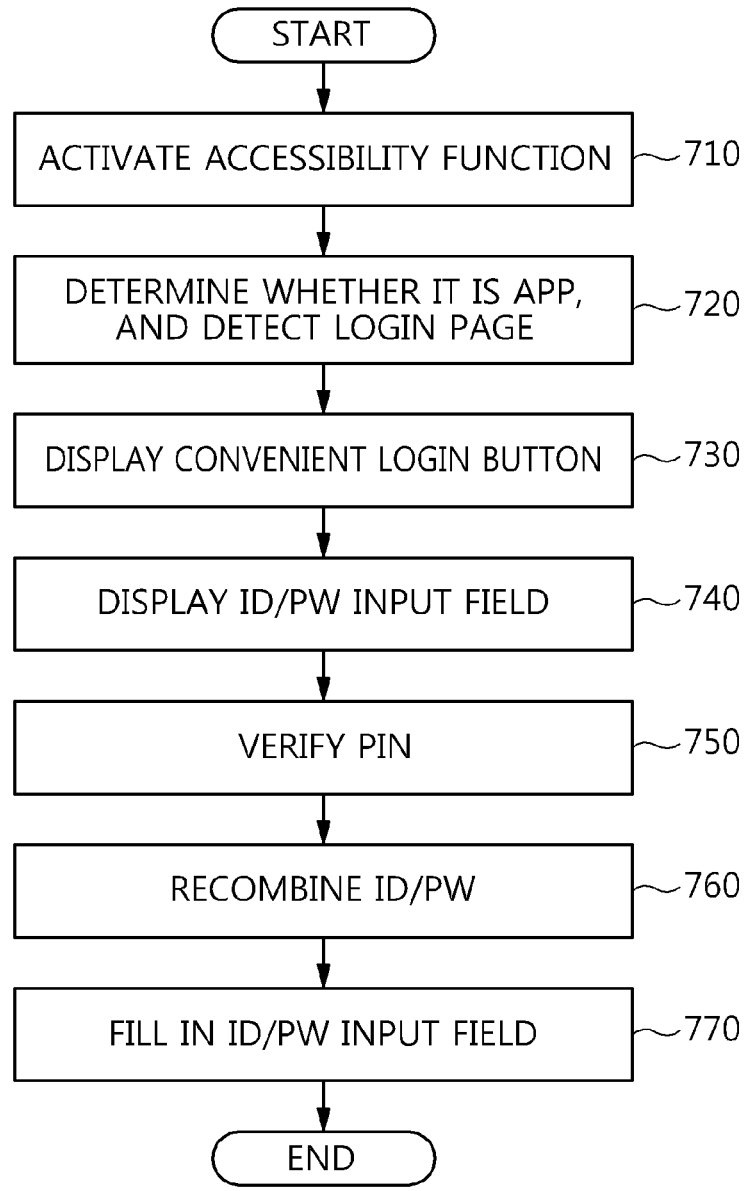
FIG. 7 is a flowchart illustrating a convenient login method of automatically detecting and filling in a login field within a web environment or an application according to another embodiment of the present invention.

FIG. 7 is a flowchart illustrating a convenient login method of automatically detecting and filling in a login field within a web environment or an application according to another embodiment of the present invention.

At step 710, in the convenient login method of automatically detecting and filling in a login field within a web environment or an application according to another embodiment of the present invention, when the user accesses a login page using any one of a mobile web browser and a mobile application, the accessibility function of the terminal may be activated by executing the script of a mobile program that is different from the mobile web browser and the mobile application.

Furthermore, at step 720, in the convenient login method of automatically detecting and filling in a login field within a web environment or an application according to another embodiment of the present invention, whether an access program for the login page is the mobile web browser or the mobile application may be determined using the accessibility function, and an ID/PW input field within the login page may be detected based on the result of the determination.

Furthermore, at step 730, in the convenient login method of automatically detecting and filling in a login field within a web environment or an application according to another embodiment of the present invention, a convenient login button may be output to one side of the ID/PW input field by executing a script.

Furthermore, at step 740, in the convenient login method of automatically detecting and filling in a login field within a web environment or an application according to another embodiment of the present invention, when the user 150 clicks on the convenient login button, a personal ID number input box for the authentication of the user may be displayed.

Furthermore, at step 750, in the convenient login method of automatically detecting and filling in a login field within a web environment or an application according to another embodiment of the present invention, when the user enters a personal ID number in the personal ID number input box, the server 120 may verify the personal ID number.

Furthermore, at step 760, in the convenient login method of automatically detecting and filling in a login field within a web environment or an application according to another embodiment of the present invention, when the verification of the personal ID number is successful, the terminal 140 may recombine stored ID/PW segments.

Furthermore, at step 770, in the convenient login method of automatically detecting and filling in a login field within a web environment or an application according to another embodiment of the present invention, the terminal 140 may automatically enter the recombined ID/PW in the ID/PW input field.

Figure 8:
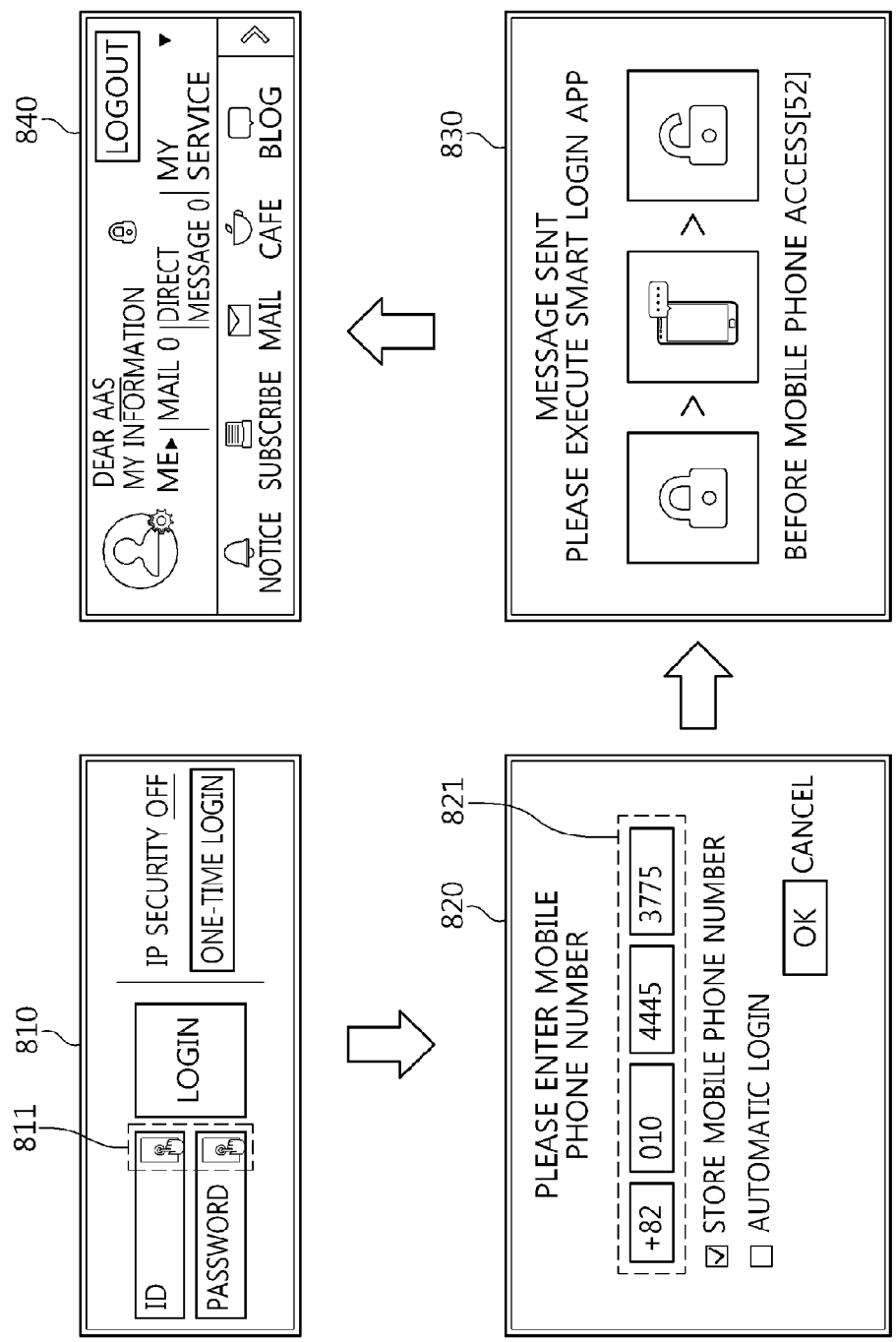
FIG. 8 illustrates an interface screen that is displayed on the client according to an example.

FIG. 8 illustrates an interface screen that is displayed on the client according to an example.

The client 110 may automatically detect and fill in a login field within a web environment or an application and provide a convenient login interface screen.

When the user 150 presses a convenient login button 811 displayed on one side of a login page on a screen 810, a screen 820 including a terminal ID information input box 821, that is, an application program interface, may be displayed by the script of a separate client program.

When the user 150 enters terminal ID information and presses an OK button on the screen 820, the screen 820 may switch to a screen 830, and a user verification procedure in the terminal 140 may be performed.

When the user verification procedure is completed, login may be automatically performed as in a screen 840.

Figure 9:
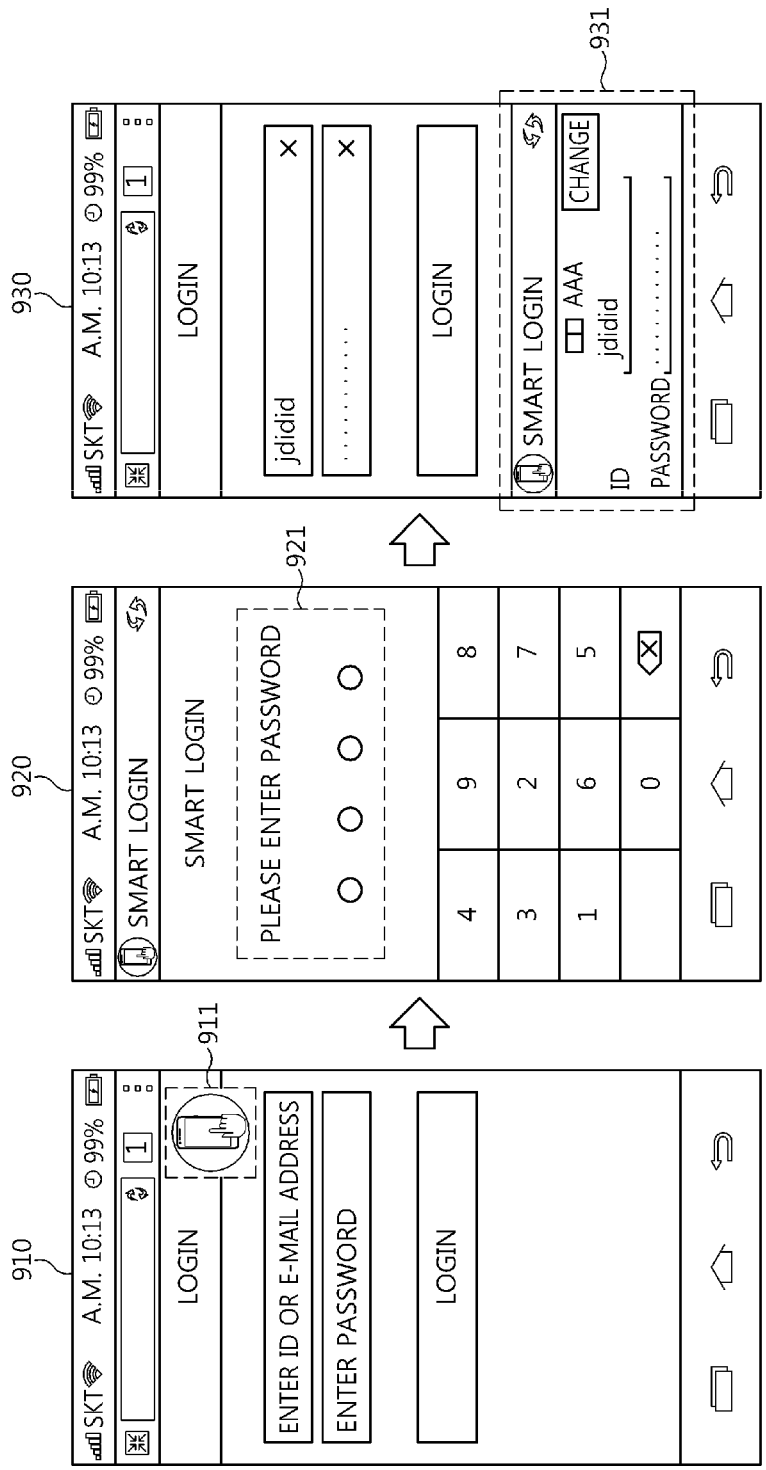
FIG. 9 illustrates an interface screen that is displayed on the terminal according to an example.

FIG. 9 illustrates an interface screen that is displayed on the terminal according to an example.

The terminal 140 may automatically detect and fill in a login field within a web environment or an application, and may provide a convenient login interface screen.

When the user 150 presses a convenient login button 911 displayed on one side of a login page on a screen 910, a screen 920 including a smart login verification box 921 may be displayed by the script of a separate mobile program.

When the user 150 enters a personal ID number and verification based on the personal ID number is successful on the screen 920, the screen 920 may be closed. The ID/PW input field of the existing screen 910 may be automatically filled in (930), and a smart login function being executed may be displayed (931).

Figure 10:
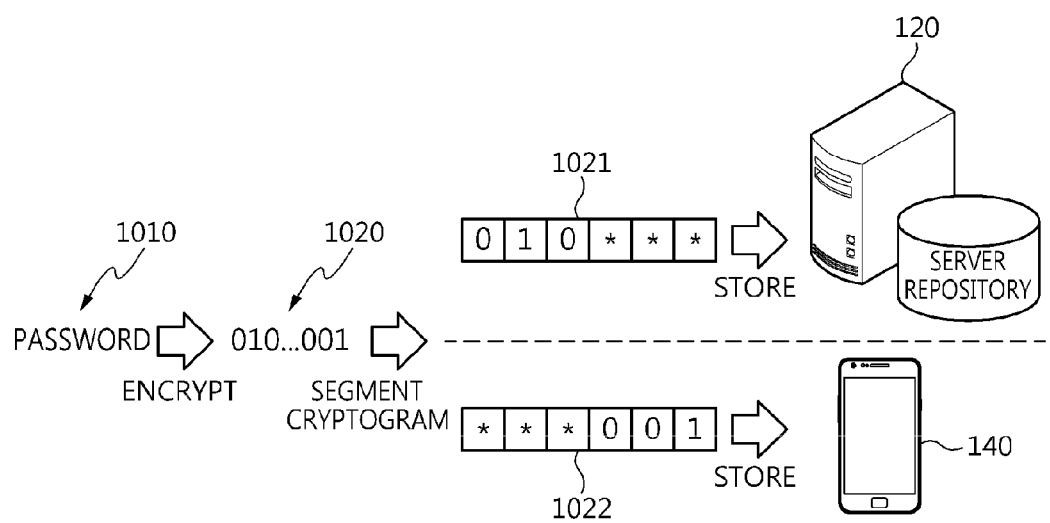
FIG. 10 illustrates the segmentation and storage of an ID/PW according to an example.

FIG. 10 illustrates the segmentation and storage of an ID/PW according to an example.

An ID/PW may be segmented and stored in the server 120 and the terminal 140.

A cryptogram 1020 may be generated by encrypting an ID/PW 1010 entered by a user. The cryptogram may be segmented into a first cryptogram 1021 and a second cryptogram 1022. After the cryptogram is segmented, the first cryptogram 1021 may be stored in the server 120, and the second cryptogram 1022 may be stored in the terminal 140.

Since the ID/PW 1010 is segmented and stored at two or more storage locations as described above, user login information can be protected even when a cryptogram is divulged from any one of the server 120 and the terminal 140.

Figure 11:
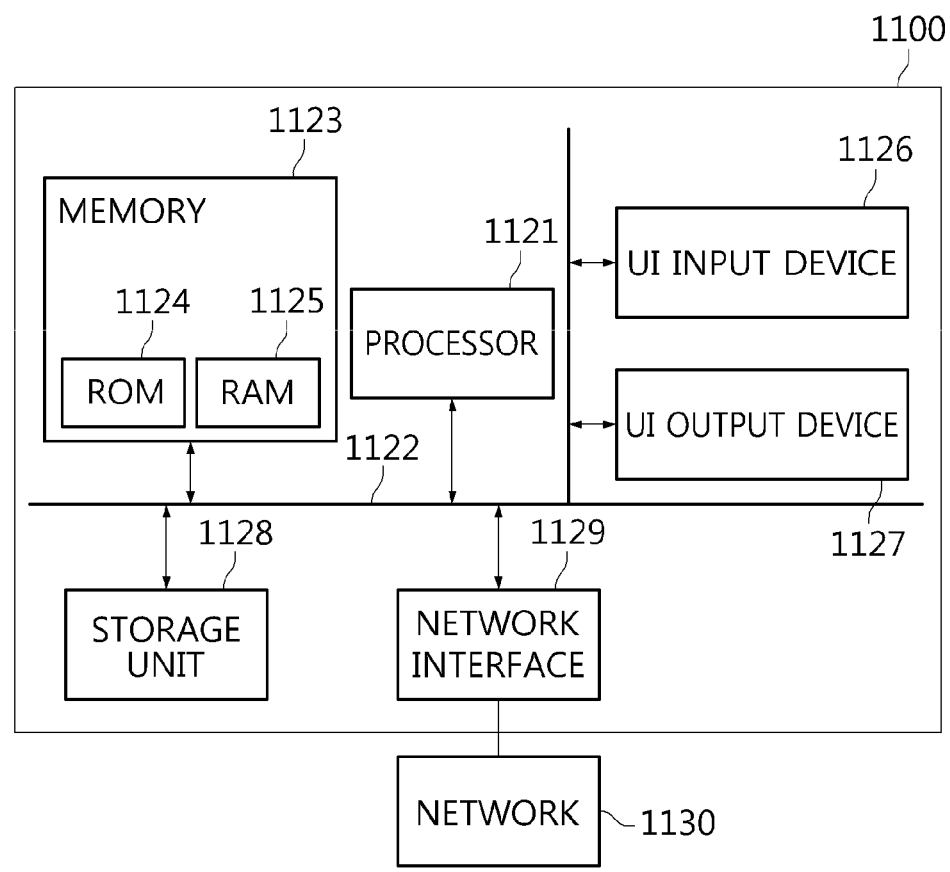
FIG. 11 illustrates a computer for implementing an apparatus according to an embodiment of the present invention.

FIG. 11 illustrates a computer for implementing an apparatus according to an embodiment of the present invention.

Each of the aforementioned apparatuses may be implemented using the computer 1100 of FIG. 11.

The apparatus may be at least one of the client 110, the server 120, and the terminal 140. In other words, each of the client 110, the server 120, and the terminal 140 may be implemented using the computer 1100.

At least one of the client 110, the server 120, and the terminal 140 may be implemented using the computer including a computer-readable recording medium. As illustrated in FIG. 11, at least one of the client 110, the server 120, and the terminal 140 may include at least one processor 1121, at least one piece of memory 1123, at least one user interface (UI) input device 1126, at least one UI output device 1127, and at least one storage unit 1128 which communicate with each other through a bus 1122. The computer 1100 may further include a network interface 1129 connected to a network 1130. The processor 1121 may be a central processing unit (CPU) or a semiconductor device for executing processing instructions stored in the memory 1123 or the storage unit 1128. Each of the memory 1123 and the storage unit 1128 may include various types of volatile or non-volatile storage media. For example, the memory 1123 may include ROM 1124 or RAM 1125.

At least one of the units of at least one of the client 110, the server 120, and the terminal 140 may be stored in the memory 1123 and configured to be executed by the at least one processor 1121. A function related to the communication of the data or information of at least one of the client 110, the server 120, and the terminal 140 may be performed via the network interface 1129.

The at least one processor 1121 may perform the aforementioned operations and calculation, and the storage unit 1128 may store the aforementioned constants, variables, and data.

As described above, the divulgence of login information can be minimized because login is performed through only the authentication of a mobile phone without requiring a user to enter an ID/PW in a login page.

A more convenient login service can be provided because an ID/PW input field is automatically detected in a login page and an ID/PW is automatically entered in the detected input field.

A login service having further enhanced security can be provided because the ID/PW of a user are segmented and stored in two or more isolated repositories, the segmented and stored ID/PW of the user is recombined after user authentication has been successful, and the recombined ID/PW of the user is used.

The method according to at least one embodiment of the present invention may be implemented as a program or a smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

Although the embodiments have been described in conjunction with the limited embodiments and drawings, it will be apparent to those skilled in the art that various modifications and variations can be made from the foregoing description. For example, if at least one of the above-described technologies is performed in an order which is different from that of the described corresponding method or if all or some of the above-described elements, such as the system, the structure, the apparatus and the circuit, are connected or combined in a form which is different from the above-described form or replaced with one or more elements or equivalents, appropriate results may be achieved.

Therefore, other implementations, other embodiments, and equivalents to the claims fall within the scope of the following claims.

What is claimed is:

1. A convenient login service provision method for automatically detecting and filling in a login field within a web environment or an application for a specific website or specific application, comprising:
    analyzing, by a client, an HTML sentence structure of a login page by executing a script of a client program, different from a web browser, when a user accesses the login page via the web browser;
    detecting, by the client, an identification/password (ID/PW) input field within the login page as a result of the analysis of the HTML sentence structure;
    outputting, by the client, a convenient login button to one side of the ID/PW input field by executing the script;
    outputting, by the client, an input box for obtaining any one of a telephone number and ID information of a terminal when the user clicks on the convenient login button;
    sending, by a server, a message for running of a mobile program to the terminal when the user enters any one of the telephone number and ID information of the terminal in the input box;
    displaying, by the terminal, a personal ID number input box by executing a script of the mobile program;
    verifying, by the server, a personal ID number when the user enters the personal ID number in the personal ID number input box;
    recombining, by the terminal, a segmented and stored ID/PW if the verification of the personal ID number is successful, and sending the recombined ID/PW to the client via the server; and
    receiving, by the client, the recombined ID/PW and automatically entering by the client, the recombined ID/PW in the ID/PW input field of the specific website or the specific application.

2. A convenient login service provision method of automatically detecting and filling in a login field within a web environment or an application for a specific website or specific application, comprising:
    activating, by a client, an accessibility function of the client by executing a script of a mobile program, different from a mobile web browser, and a mobile application when a user accesses a login page using any one of the mobile web browser and the mobile application;
    determining, by the client, whether an access program for the login page is the mobile web browser or the mobile application using the accessibility function, and detecting, by the client, an ID/PW input field within the login page based on a result of the determination;
    outputting, by the client, a convenient login button to one side of the ID/PW input field by executing the script;
    displaying, by the client, a personal ID number input box for authenticating the user when the user clicks on the convenient login button;

verifying, by a server, the personal ID number when the user enters a personal ID number in the personal ID number input box;

recombining, by a terminal, a segmented and stored ID/PW if the verification of the personal ID number is successful; and automatically entering, by the client, the recombined ID/PW in the ID/PW input field of the specific website or the specific application.

3. A client, comprising:

an ID/PW field detection unit configured to detect an ID/PW input field within a login page when a user accesses the login page via a web browser of a specific webpage;

an ID/PW field filling-in unit configured to output a convenient login button to one side of the ID/PW input field, output an input box for obtaining any one of a telephone number and ID information of a terminal when the user clicks on the convenient login button, and automatically entering an ID/PW received from the terminal in the ID/PW input field via a server for the specific webpage when the user enters any one of the telephone number and ID information of the terminal in the input box; and a communication unit configured to encrypt any one of the telephone number and ID information of the terminal entered in the input box by the user, and send any one of the encrypted telephone number and the encrypted ID information to the terminal via the server.

4. The client of claim 3, wherein the ID/PW field detection unit detects the ID/PW input field within the login page by executing a script of a client program that is different from the web browser.

5. The client of claim 4, wherein the ID/PW field filling-in unit outputs the convenient login button and the input box to the login page and also automatically enters the ID/PW in the ID/PW input field by executing the script.

6. The client of claim 3, wherein ID/PW segments of the ID/PW are stored at two or more storage locations.

7. The client of claim 6, wherein:

the ID/PW is segmented into the ID/PW segments and stored in the terminal and the server; and the ID/PW field filling-in unit receives the ID/PW generated by the terminal through recombination of the ID/PW segments.

8. The client of claim 3, wherein the ID/PW field detection unit determines an input field, whose input tag is a password type, to be a password input field by analyzing an HTML sentence structure of the login page, and determines an input field immediately before the password input field to be an ID input field.

9. The client of claim 3, wherein, when the user enters any one of the telephone number and ID information of the terminal in the input box, and the communication unit delivers any one of the telephone number and ID information of the terminal to the server so that the server sends a message for running of a mobile program to the terminal.

10. The client of claim 3, wherein the ID/PW field detection unit receives the ID/PW if verification of a personal ID number performed by the terminal and the server is successful.

11. A terminal, comprising:

an ID/PW field detection unit configured to detect an ID/PW input field within a login page when a user accesses the login page using any one of a mobile web browser and a mobile application;

an ID/PW field filling-in unit configured to output a convenient login button to one side of the ID/PW input field, output a personal ID number input box for authenticating the user when the user clicks on the convenient login button, and automatically enter an ID/PW in the ID/PW input field for a specific website or a specific mobile application if the authentication is successful;

a user authentication request unit configured to send a PIN number, input to the terminal by the user, to a server in order to request the server to verify whether the user is an approved user;

a communication unit configured to send the ID/PW to a client via the server when login to a web page is requested by the client; and an ID/PW recombination unit configured to segment and store the ID/PW of the user and recombine the segmented and stored ID/PW.

12. The terminal of claim 11, wherein the ID/PW field detection unit detects the ID/PW input field within the login page by executing a script of a mobile program, different from the mobile web browser and the mobile application.

13. The terminal of claim 12, wherein the ID/PW field filling-in unit outputs the convenient login button to the login page and also automatically enters the ID/PW to the ID/PW input field by executing the script.

14. The terminal of claim 11, wherein the ID/PW recombination unit stores ID/PW segments of the ID/PW at two or more storage locations.

15. The terminal of claim 14, wherein the ID/PW recombination unit stores the ID/PW segments of the ID/PW in the terminal and the server, and recombines the ID/PW segments into the ID/PW.

16. The terminal of claim 11, wherein the ID/PW field detection unit activates an accessibility function of the terminal, determines whether an access program for the login page is the mobile web browser or the mobile application using the accessibility function, and detects the ID/PW input field within the login page based on a result of the determination.

17. The terminal of claim 16, wherein the ID/PW field detection unit obtains a name of an application package being executed on the terminal using the accessibility function, determines the access program to be the mobile web browser if the name of the application package is identical with a name of a predetermined mobile web browser, and determines the access program to be the mobile application if the name of the application package is not identical with the name of the predetermined mobile web browser.

18. The terminal of claim 17, wherein the ID/PW field detection unit detects the ID/PW input field by analyzing an HTML sentence structure of the login page if the access program is the mobile web browser, and detects the ID/PW input field by analyzing user interface data of the login page if the access program is the mobile application.

19. A computer program stored in a medium in order to execute a method according to any one of claims 1 and 2 in combination with hardware.

20. A convenient login system or automatically detecting and filling in a login field within a web environment or an application for a specific website or specific application, comprising:

a client configured to detect an ID/PW input field within a login page when a user accesses the login page via a web browser, output a convenient login button to one side of the ID/PW input field, output an input box for obtaining any one of a telephone number and ID information of a terminal when the user clicks on the convenient login button, and automatically enter an ID/PW, received from the terminal, in the ID/PW input field for the specific website or the specific application via a server when the user enters any one of the telephone number and ID information of the terminal in the input box;

the server configured to receive any one of the telephone number and ID information of the terminal from the client, send a message for running of a mobile program to the terminal, receive the ID/PW from the terminal when the mobile program is run, and send the ID/PW to the client; and the terminal configured to run the mobile program, recombine a segmented and stored ID/PW, and send the recombined ID/PW to the client via the server.

* * * * *